B. Holly,

Pump.

Nº 168.

Reissued May 7, 1850.

UNITED STATES PATENT OFFICE.

BIRDSILL HOLLY, OF SENECA FALLS, NEW YORK.

IMPROVEMENT IN PUMPS.

Specification forming part of Letters Patent No. 6,500, dated June 5, 1849; Reissue No. 168, dated May 7, 1850.

*To all whom it may concern:*

Be it known that I, BIRDSILL HOLLY, of Seneca Falls, in the county of Seneca and State of New York, have invented a new and Improved Pump; and I do hereby declare the following to be a full, clear, and exact description thereof, reference being had to the accompanying drawings, making a part of this specification, in which—

Figure 1:
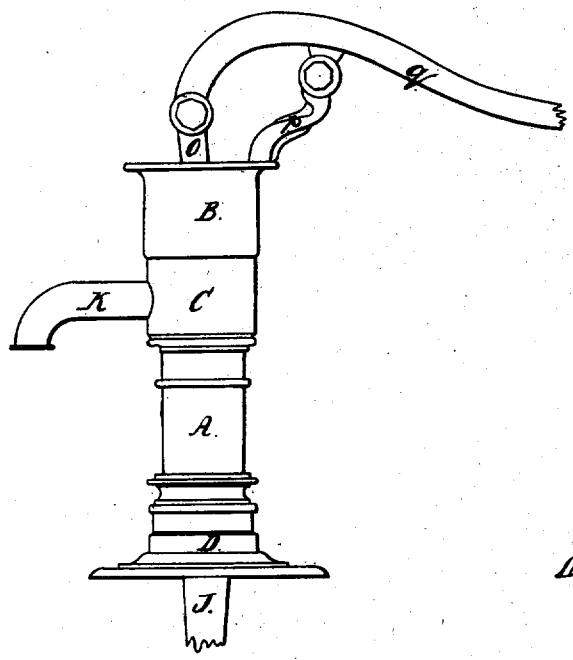
Figure 2:
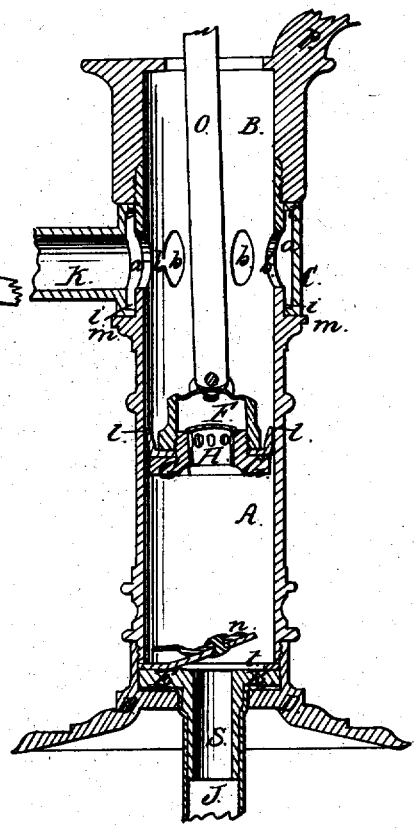

Figure 1 is an elevation, and Fig. 2 a vertical section.

Similar letters indicate like parts in both figures.

A is the main portion of the pump-barrel, which is combined with the other parts of my improved pump, as represented in Fig. 2.

The short tube C, placed upon and inclosing a portion of the upper end of A, is cast in one piece with the nozzle K, within the flanges *i i*. Projecting inward from the ends of C there is an annular chamber, *a*, surrounding the series of apertures *b b* in the sides of the pump-barrel, and communicating with the nozzle. The object of this arrangement is to enable the position of the nozzle to be readily changed from one side to the other, as circumstances may require. The lower end of the nozzle-ring C rests upon and is accurately ground to the upper side of the flange *m*. The upper portion, B, of the pump-barrel is screwed to the upper extremity of A, and fits accurately to the upper end of the nozzle-ring C, and consequently serves to confine the nozzle in any desired position. The fulcrum-arm *p*, to which the handle *q* is jointed, is cast in one piece with the upper part, B, of the pump-barrel.

The base D of the pump is of the form represented in Fig. 2, and is screwed to the lower extremity of A. Within the cup rising from D there is located the circular valve-plate E, from which descends the tube S, passing down through a hole in the center of D. *t* is a leather disk, placed upon the valve-plate E, the periphery of which is pressed down firmly thereon by the lower extremity of A, which makes a water-tight packing between the two. The valve *n*, that closes the aperture in the valve-plate, is cut from the center of the leather disk *t*, and is suitably weighted with metal.

The lead induction-pipe J, which descends from the pump into the well or cistern, is connected to the base of the pump in the manner represented in Fig. 2, to wit: The end of the lead pipe is passed up through the hole in the center of the base D, and a flange is formed at its extremity by forcing a mandrel into it. The tube S, descending from the valve-plate E, is then inserted into the open mouth of the lead pipe, and after placing the leather disk *t* upon the valve-plate the pump-barrel A is screwed into the cup rising from the base D, which forces down the valve-plate upon the flange of the lead pipe at the same time that the largest portion of the tube S, near the valve-plate, is forced into the mouth of the pipe, and firmly presses it against the sides of the aperture in the base. The cup rising from the base D, having a screw-thread cut upon its inner sides, the metallic disk E placed therein, which serves as a valve-seat, and in connection with the tube S, descending therefrom through an aperture in the bottom of the base, serves to connect the induction-pipe to the pump when the barrel A is screwed to the base without soldering or the addition of anything exterior to the pump. This manner of combining the induction-pipe and valve-seat with the pump also enables the pump to be detached from its base, whenever repairs may be required upon the valve, piston, or induction-pipe, without unfastening the base of the pump from the platform over the cistern or well.

The respective parts of the piston-plunger that I make use of in my pump are represented in Fig. 2.

The cap F has a series of perforations in its top, and is screwed to the ring G. The inner edge of a ring of leather, *l*, is inserted between F and G, the outer periphery of which is turned upward and bears against the sides of the pump-barrel. Consequently, as the piston is forced downward there will be no friction between its sides and the sides of the pump-barrel; but when the piston is drawn upward the weight of water above it will force the edge of the leather ring against the sides of the pump-barrel with sufficient force to prevent the loss of any water around the same.

H is a perforated tube, placed within the ring G, having a conical flange projecting from its upper end, which fits into a seat on the upper edge of the inner periphery of G. As the piston is forced down the tube H will rise into the cap F, allowing the water to pass through the perforations in its sides into the cap F, from which it will pass through the holes in the top of the same. The water will also force up the edge of the packing-ring *l*, and pass upward around the sides of the ring G as it descends. When the piston is drawn upward, the tube H will descend into its place and close the aperture in the ring G, and the pressure of water upon the packing-ring *l* will force its edge against the sides of the pump-barrel and prevent any leakage about the same, as above described. The water elevated by the piston-plunger into the pump-barrel will pass through the holes *b b* in its sides into the annular space *a*, within the ring C, and thence will be discharged through the nozzle K.

What I claim as my invention, and desire to secure by Letters Patent, is—

1. The combination of the nozzle with the pump-barrel in such a manner that the nozzle can be readily changed from side to side and secured in any desired position, substantially as herein represented and described.

2. The manner of connecting the induction-pipe J, the valve *n*, and its seat E, with the base D of the pump without the aid of rivets or solder, and in such a manner that when the base of the pump has been securely fastened to a platform the respective parts of the pump, as also the induction-pipe, can be combined with the base or detached therefrom without disturbing its fastenings, to wit: by means of the cup rising from the center of the base D, which has a screw cut in its inner periphery and a hole in the center of its bottom, through which hole the induction-pipe J is inserted and enlarged by a mandrel, the metallic disk E, placed within the said cup, with the tube S descending therefrom inserted into the upper end of the induction-pipe, the leather disk *t*, from the center of which the valve *n* is cut, placed on the disk E, and the whole securely combined with each other by inserting the screw formed in the outer periphery of the lower end of the pump-barrel within the screw-thread formed in the inner periphery of the base-cup, and turning the pump-barrel until the lower end thereof forces the above enumerated parts into the position represented in Fig. 2.

The above specification of my improvements in pumps signed and witnessed this 6th day of April, 1850.

BIRDSILL HOLLY.

Witnesses:
GEO. W. S. MILLER,
C. B. KULER.